(No Model.)

J. T. STOCKTON.
WHEEL.

No. 585,055.  Patented June 22, 1897.

Witnesses
Perry Kingman.
Alfred Townsend.

Inventor
Joshua T. Stockton
by
Hazard Townsend
his atty's ated between the rim and the hub of the wheel.

UNITED STATES PATENT OFFICE.

JOSHUA T. STOCKTON, OF SANTA ROSA, CALIFORNIA.

WHEEL.

SPECIFICATION forming part of Letters Patent No. 585,055, dated June 22, 1897.

Application filed June 14, 1895. Serial No. 552,866. (No model.)

*To all whom it may concern:*

Be it known that I, JOSHUA T. STOCKTON, a citizen of the United States, residing at Santa Rosa, in the county of Sonoma and State of California, have invented a new and useful Improvement in Wheels, of which the following is a specification.

My invention relates to that class of vehicles having a comparatively rigid or unyielding rim and spring-spokes interposed between the rim and the hub of the wheel.

One object of my invention is to provide a device of this kind which will be extremely light, cheap, and simple in construction, but will be strong and durable and exceedingly satisfactory in use.

The particular object of my invention is to so connect the spring-spokes of the wheel with each other that the spokes will act practically as a unit and will each strengthen and support in turn the spoke which is subjected to the weight of the load.

My invention comprises the features of construction and combinations of parts hereinafter fully set forth and claimed.

Figure 1:
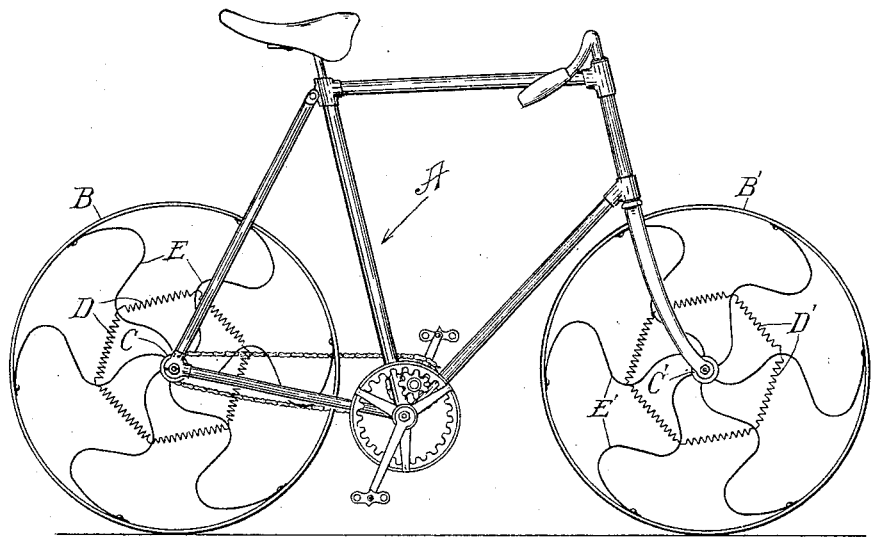
Figure 2:
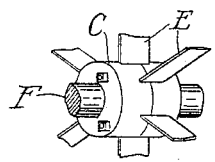

Figure 1 is a side elevation of a bicycle having my invention applied thereto. Fig. 2 is a fragmental perspective view of the hub, showing fragments of the flat metal spokes secured in place therein, each having its greatest width parallel with the axis of the axle.

My invention relates particularly to means whereby I am enabled to provide a wheel having a practically rigid rim and flat spring-metal spokes connecting the rim with the hub, the spokes being so arranged as to mutually support and strengthen each other, thus to secure great lightness of construction, cheapness, and durability.

In the drawings, A represents the frame of a bicycle, and B B represent the wheels thereof.

C represents the hubs of the wheels, and D represents suitable springs connecting the spokes E with each other intermediate the rim of the wheel and the hub of the wheel.

Each spoke is formed of flat spring metal and is arranged with its greatest width parallel with the axis of the axle F in order to give great strength against sidewise strain. In order to secure sufficient resiliency of the spring-metal spokes, I bend each spoke into the form of the letter S, the outer limb of the S being larger than the inner limb, thus to cause the spoke to yield more freely at its outer end than at its inner end.

By connecting the spokes with each other by means of the springs D, when one spoke is subject to pressure and bends, the strain is communicated through the springs to the adjoining spokes, and so on through the entire wheel, thus distributing the strain throughout the entire number of spokes in the wheel and enabling me to provide a fewer number of spokes made of lighter metal than would otherwise be necessary, thus securing lightness without sacrificing strength.

My device being made wholly of metal is not subject to puncture, and by reason of the resiliency of the spokes, when used upon a bicycle or other vehicle, the shock or jar of riding over an unequal surface is absorbed before it reaches the rider, thus practically producing the same result as the pneumatic tire.

Now, having described my invention, what I claim as new, and desire to secure by Letters Patent, is—

In a wheel, the combination set forth of the hub of the wheel; the rim; the flat spring-spokes, each arranged with its greatest width parallel with the axis of the axle of the wheel and formed in S shape, having one end attached to the hub and its other end attached to the rim; and the reinforcing-springs connecting the spokes with each other intermediate the rim and the hub, substantially as and for the purpose set forth.

JOSHUA T. STOCKTON.

Witnesses:
    M. H. PEERMAN,
    J. H. NEYCE.